(No Model.)
C. S. BRADLEY.
ELECTRIC CONDENSER.
No. 603,722. Patented May 10, 1898.
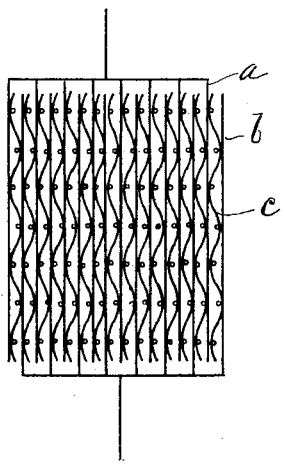
Witnesses:
Elizabeth Ewing
Alick F. Macandrew
Inventor
Charles S. Bradley
By R. N. Kead
his Attorney
THE NORRIS PETERS CO., PHOTO-LITHO., WASHINGTON, D. C.

UNITED STATES PATENT OFFICE.

CHARLES S. BRADLEY, OF AVON, NEW YORK.

ELECTRIC CONDENSER.

SPECIFICATION forming part of Letters Patent No. 603,722, dated May 10, 1898.

Application filed July 29, 1897. Serial No. 646,339. (No model.)

*To all whom it may concern:*

Be it known that I, CHARLES S. BRADLEY, a citizen of the United States, and a resident of Avon, county of Livingston, State of New York, have invented certain new and useful Improvements in Electric Condensers, of which the following is a specification.

This invention relates to electric condensers, the object being to provide a condenser of greatly-increased capacity, bulk for bulk, as compared with the condensers as commonly organized.

I carry out the invention by using as a dielectric stearate of lead, which I have ascertained has a specific inductive capacity much greater than paraffin-wax or other materials heretofore employed as a dielectric in condensers. Pure stearate of lead free from water and other deleterious admixtures has a specific inductive capacity of seventy-four to one as compared with air and offers a great resistance to puncture. This material may be used in any convenient way for separating the several condenser-plates.

In the accompanying drawing is illustrated one form of construction found convenient in practice.

In order to reduce the compass of the condenser as much as possible, it is desirable to employ thin films of the dielectric. It is important also to prevent short-circuiting by accidental contact of opposite plates. This end is attained in the type shown by using between the several plates $a\ b$ sheets of an open-work fabric $c$, such as mosquito-netting, the dielectric material being rolled into the meshes of the netting and over the same to the desired thickness either before or after applying the same to the plate. By such a construction the main part of the separating medium is of high specific inductive capacity, thereby rendering the average specific inductive capacity of the total dielectric high. After a sufficient number of plates have been assembled to form a condenser of the desired capacity the whole may be brought to a proper temperature to soften the stearate of lead and submitted to pressure, so as to bring the plates into close and uniform relation to one another.

Having thus described my invention, what I claim as new, and desire to secure by Letters Patent, is—

1. An electric condenser having as a dielectric stearate of lead.

2. An electric condenser having between its several plates a layer of stearate of lead of uniform thickness.

3. An electric condenser having its several plates separated by a fibrous insulating material the pores and meshes of which are filled with stearate of lead.

4. An electric condenser having between its several plates a spacing insulating material containing a plurality of transverse openings filled with a material of higher specific inductive capacity whereby part of the inner space between the plates is filled solely with the latter material.

5. An electric condenser having between its several plates a spacing insulating material having a plurality of transverse openings filled with stearate of lead.

In testimony whereof I have hereunto subscribed my name this 2d day of July, A. D. 1897.

CHARLES S. BRADLEY.

Witnesses:
ROBT. H. READ,
ALICK G. MACANDREW.